(12) United States Patent
Dale et al.

(10) Patent No.: US 10,090,530 B2
(45) Date of Patent: Oct. 2, 2018

(54) NON-CARBON MIXED-METAL OXIDE ELECTROCATALYSTS

(71) Applicant: Nissan North America, Inc., Franklin, TN (US)

(72) Inventors: Nilesh Dale, Novi, MI (US); Ellazar Niangar, Redford, MI (US); Taehee Han, Farmington Hills, MI (US); Kan Huang, Northville, MI (US); Gregory DiLeo, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 435 days.

(21) Appl. No.: 14/169,720

(22) Filed: Jan. 31, 2014

(65) Prior Publication Data

US 2015/0221955 A1    Aug. 6, 2015

(51) Int. Cl.
| | |
|---|---|
| *H01M 4/02* | (2006.01) |
| *H01M 4/86* | (2006.01) |
| *H01M 4/90* | (2006.01) |
| *H01M 4/92* | (2006.01) |
| *H01M 4/88* | (2006.01) |
| *H01M 8/1018* | (2016.01) |

(52) U.S. Cl.
CPC ....... *H01M 4/8652* (2013.01); *H01M 4/8657* (2013.01); *H01M 4/8817* (2013.01); *H01M 4/9016* (2013.01); *H01M 4/9075* (2013.01); *H01M 4/925* (2013.01); *H01M 2008/1095* (2013.01); *H01M 2250/20* (2013.01); *Y02E 60/50* (2013.01); *Y02T 90/32* (2013.01)

(58) Field of Classification Search
CPC .. H01M 4/9075; H01M 4/925; H01M 4/8652; H01M 4/8657; H01M 4/8817; H01M 4/9016
See application file for complete search history.

(56) References Cited

U.S. PATENT DOCUMENTS

| | | | |
|---|---|---|---|
| 6,855,453 | B2 | 2/2005 | Bett et al. |
| 7,902,111 | B2 | 3/2011 | Roev et al. |
| 2002/0107140 | A1 | 8/2002 | Hampden-Smith et al. |
| 2006/0188774 | A1 | 8/2006 | Niu et al. |
| 2006/0251954 | A1* | 11/2006 | Merzougui ............. H01M 4/86 429/482 |
| 2007/0037041 | A1* | 2/2007 | Cai ...................... C01G 23/047 429/524 |
| 2008/0096093 | A1* | 4/2008 | Jang .................... H01M 4/8663 429/483 |

(Continued)

FOREIGN PATENT DOCUMENTS

| | | | | |
|---|---|---|---|---|
| JP | WO 2012046138 A1 * | 4/2012 | ............ | B01J 21/063 |
| WO | WO 2013092568 A1 * | 6/2013 | .......... | H01M 4/9016 |

*Primary Examiner* — Jimmy Vo
(74) *Attorney, Agent, or Firm* — Young Basile Hanlon & MacFarlane, P.C.

(57) ABSTRACT

Electrocatalysts having non-corrosive, non-carbon support particles are provided as well as the method of making the electrocatalysts and the non-corrosive, non-carbon support particles. Embodiments of the non-corrosive, non-carbon support particle consists essentially of titanium dioxide and ruthenium dioxide. Active catalyst particles of a platinum alloy are deposited onto each non-carbon composite support particle. The electrocatalyst can be used in fuel cells, for example.

3 Claims, 14 Drawing Sheets

(56) References Cited

U.S. PATENT DOCUMENTS

2013/0122402 A1  5/2013  Hong et al.
2014/0349203 A1* 11/2014 Klose-Schubert .......................... H01M 4/9016
                                                                          429/418

* cited by examiner

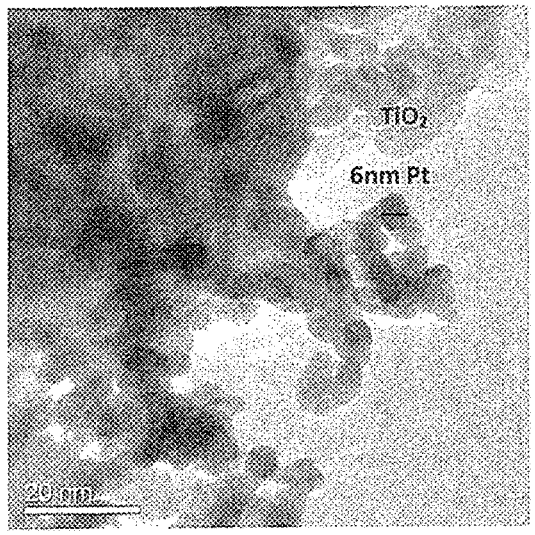 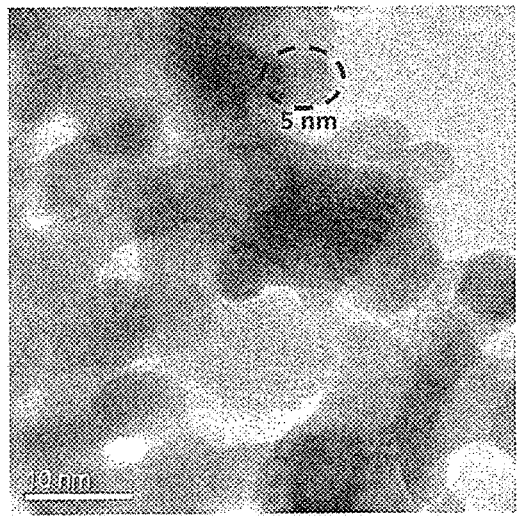
FIG. 11A  FIG. 11B
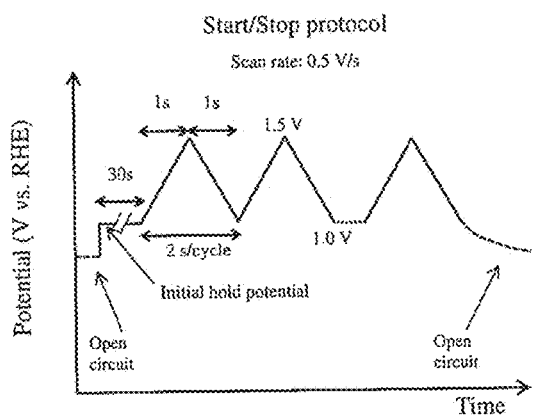
FIG. 12A
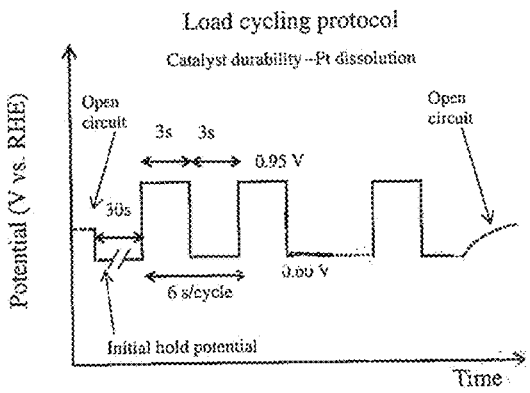
FIG. 12B FIG. 13A
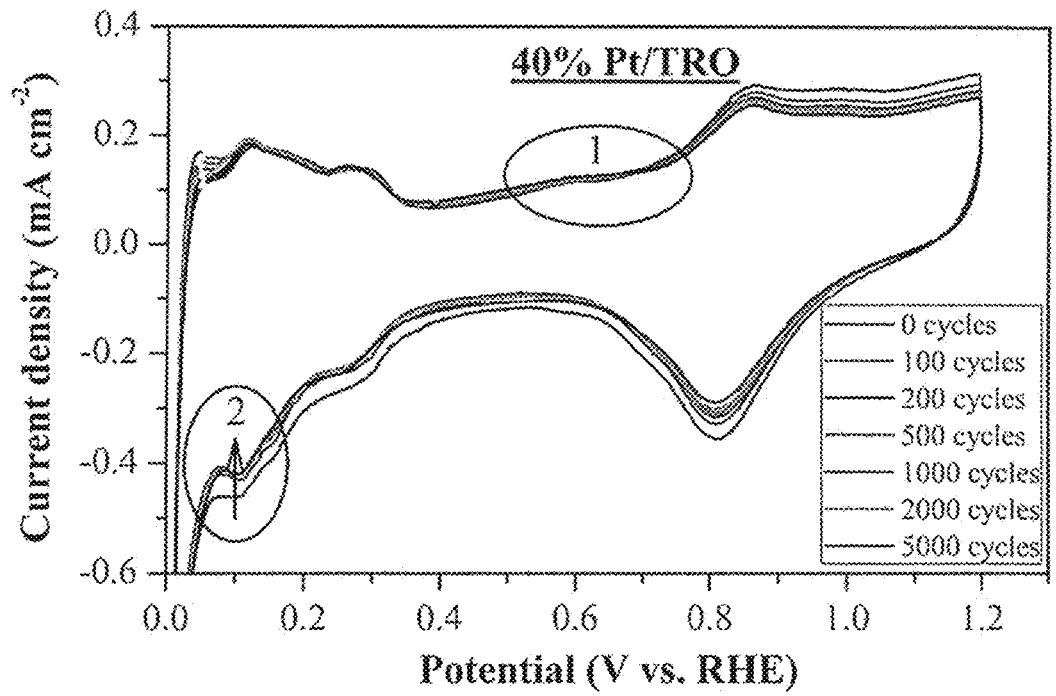
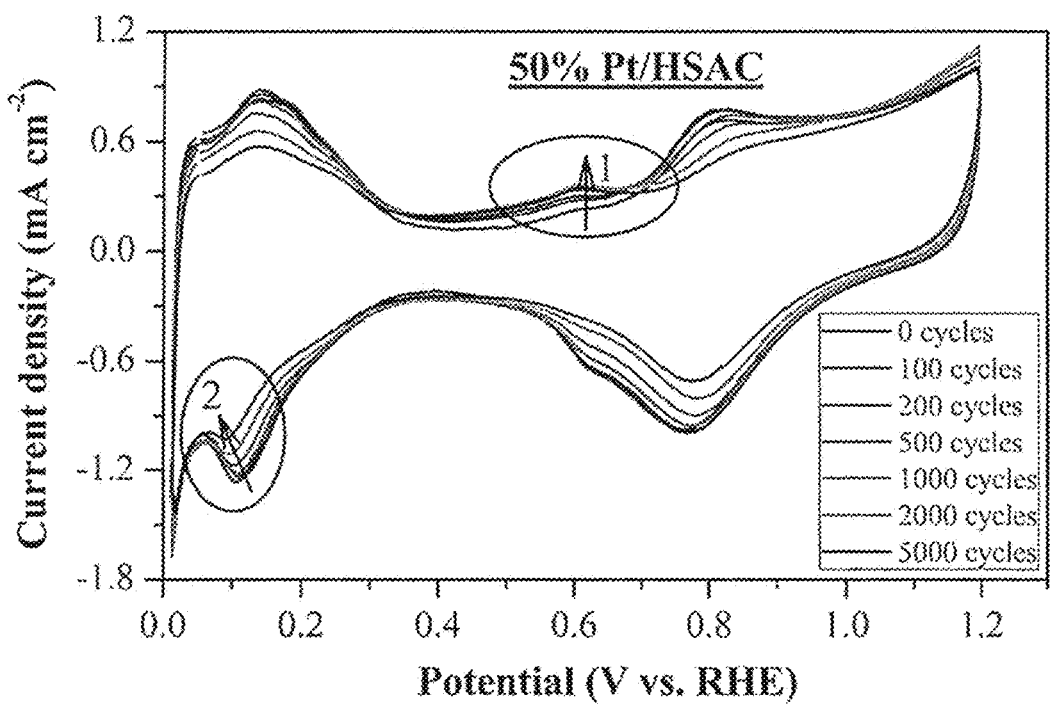
FIG. 13B

NON-CARBON MIXED-METAL OXIDE ELECTROCATALYSTS

TECHNICAL FIELD

This disclosure relates to non-carbon mixed material electrocatalysts, and in particular, to a titanium-ruthenium oxide support used to produce electrocatalysts for hydrogen fuel cell vehicles having active catalyst particles deposited thereon.

BACKGROUND

Carbon has traditionally been the most common material of choice for polymer electrolyte fuel cell (PEFC) electrocatalyst supports due to its low cost, high abundance, high electronic conductivity, and high Brunauer, Emmett, and Teller (BET) surface area, which permits good dispersion of platinum (Pt) active catalyst particles. However, the instability of the carbon-supported platinum electrocatalyst is a key issue that currently precludes widespread commercialization of PEFCs for automotive applications.

Carbon is known to undergo electrochemical oxidation to carbon dioxide. Despite the fact that the cathode potential is usually significantly higher than the standard potential for carbon oxidation, the actual rate of carbon oxidation is very slow due to a very low standard heterogeneous rate constant. During operation of automotive PEFC stacks, fuel/air mixed fronts are known to occur during stack startup and shutdown. Air usually fills the flow channels when the stack is nonoperational. During startup, the hydrogen fed into the stack displaces the air from the anode flow channels, leading to a mixed fuel-oxidant. These mixed-reactant fronts result in significant electrode polarization. Under these conditions, the PEFC cathode can experience high potentials, corresponding to a significantly higher overpotential for the carbon oxidation reaction. The electrochemical reaction rate constant, which increases exponentially with overpotential, is significantly enhanced during this period. Under these conditions, carbon corrosion is exacerbated.

In a second mechanism, fuel starvation at the anode catalyst sites as a consequence of fuel overutilization or flooding (lack of fuel access to catalyst site) also exacerbates carbon corrosion. In this case, carbon is oxidized to provide protons and electrons in place of the absent fuel.

The adverse consequences of carbon corrosion include (i) platinum nanoparticle agglomeration/detachment; (ii) macroscopic electrode thinning/loss of porosity in the electrode; and (iii) enhanced hydrophilicity of the remaining support surface. The first results in loss of catalyst active surface area and lower mass activity resulting from reduced platinum utilization, whereas the second and third result in a lower capacity to hold water and enhanced flooding, leading to severe condensed-phase mass transport limitations. Clearly, both consequences directly impact PEFC cost and performance, especially in the context of automotive stacks.

SUMMARY

Electrocatalysts having non-corrosive, non-carbon support particles are disclosed as well as the method of making the electrocatalysts and the non-corrosive, non-carbon support particles. Embodiments of the non-corrosive, non-carbon support particle consists essentially of titanium dioxide and ruthenium dioxide. Fuel cells comprising the electrocatalyst herein are also disclosed.

In one embodiment, the electrocatalyst has non-carbon composite support particles formed from $TiO_2$ and $RuO_2$. $TiO_2$ has a first particle size and $RuO_2$ a second particle size, the first particle size being greater than the second particle size as illustrated. $RuO_2$ is deposited onto $TiO_2$ to form the non-carbon composite support particles. Also disclosed is a method of making the embodiment.

In another embodiment, the electrocatalyst has non-carbon composite support particles formed from $TiO_2$ and $RuO_2$, where $TiO_2$ has a first particle size and $RuO_2$ a second particle size, the first particle size being smaller than the second particle size as illustrated. $TiO_2$ is deposited onto $RuO_2$ to form the non-carbon composite support particles. Also disclosed is a method of making the embodiment.

In another embodiment, the electrocatalyst has non-carbon composite support particles formed in a core shell structure from $TiO_2$ and $RuO_2$. $TiO_2$ is a substrate for one or more layers of $RuO_2$. Also disclosed is a method of making the embodiment.

To prepare the electrocatalyst using any of the embodiments of the $RuO_2/TiO_2$ non-carbon composite support particles disclosed herein, active catalyst particles are deposited onto the $RuO_2/TiO_2$ non-carbon composite support particles. The active catalyst particles can be a precious metal such as platinum. Platinum nanoparticles having a diameter of 3 to 6 nanometers can be used as the active catalyst particles. As an alternative to precious metal nanoparticles, precious metal alloys can be used as the active catalyst particles. Another alternative active catalyst particle that can be used with the non-carbon composite support embodiments disclosed herein is a core shell active catalyst particle.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which:

FIGS. 11A and 11B are micrographs of the Pt/TiO$_2$—RuO$_2$ catalyst showing Pt particle size;

FIG. 12A is a schematic diagram of the start-stop protocol;

FIG. 12B is a schematic diagram of the load cycling protocol;

FIGS. 13A and 13B are cyclic voltammograms obtained on 40% Pt/TiO$_2$—RuO$_2$ catalyst and 50% Pt/HSAC catalyst, respectively, tested ex situ using the start-stop protocol;

DETAILED DESCRIPTION

A viable alternative non-carbon support should possess high surface area and electron conductivity, in addition to being highly corrosion resistant across the anticipated potential/pH window. The titanium oxide-ruthenium oxide (TiO$_2$—RuO$_2$) support disclosed by the inventors herein meets these criteria.

Titanium oxide (TiO$_2$) has very good chemical stability in acidic and oxidative environments. However, titania is a semiconductor and its electron conductivity is very low. Substoichiometric titanium oxides (Ti$_2$O$_3$, Ti$_4$O$_7$, Magnéli phases) obtained by heat treatment of TiO$_2$ in a reducing environment (i.e., hydrogen, carbon) have electron conductivity similar to graphite as a consequence of the presence of oxygen vacancies in the crystalline lattice. However, the heat treatment process reduces the surface area of these materials, precluding the preparation of supported electrocatalysts with good Pt dispersion.

To overcome the deficiencies of the TiO$_2$ alone, a non-carbon mixed-metal oxide support of TiO$_2$ and ruthenium oxide (RuO$_2$) was developed. The disclosed TiO$_2$—RuO$_2$ support demonstrates both excellent initial performance and exceptional stability upon exposure to an extremely stringent accelerated test when compared to benchmarks.

Figure 1:
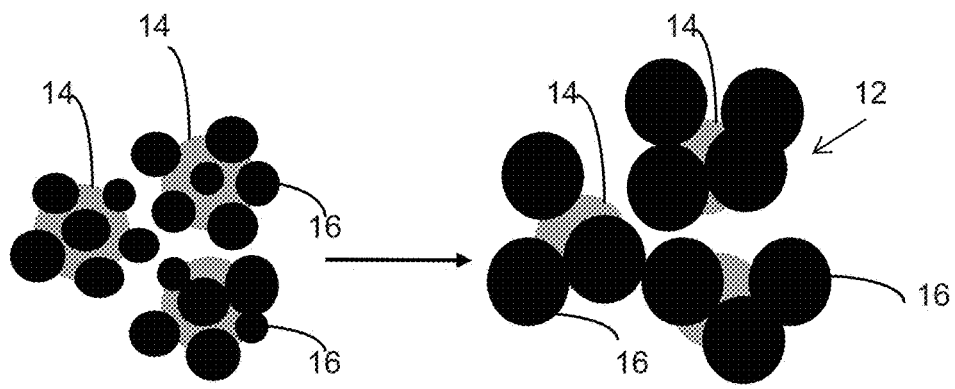
FIG. 1 is a schematic of an embodiment of non-corrosive, non-carbon composite support particles as disclosed herein.

An electrocatalyst is disclosed comprising non-corrosive, non-carbon composite support particles, each non-carbon composite support particle comprising TiO$_2$ and RuO$_2$. The TiO$_2$ and RuO$_2$ can have a similar particle size, the non-carbon composite support particles having a ratio of TiO$_2$ to RuO$_2$ ranging between 0.6:0.4 by weight to 0.8:0.2 by weight. In one embodiment disclosed herein and shown in FIG. 1, the electrocatalyst has non-carbon composite support particles 12 formed from TiO$_2$ 14 and RuO$_2$ 16. A ruthenium precursor is reduced and ruthenium is deposited onto TiO$_2$ 14 and then oxidized to RuO$_2$ to form the non-carbon composite support particles 12. TiO$_2$ 14 has a first particle size and RuO$_2$ 16 a second particle size, with the first particle size being greater than the second particle size when first introduced, with the second particle size effectively growing to approximate the first particle size as illustrated. FIG. 1 is a schematic representing the growth in ruthenium particle size due to agglomeration of the ruthenium particles as the precursor is reduced. The final size of the RuO$_2$ 16 particle can be controlled based on the amount of the precursor provided for the reduction reaction described with reference to FIG. 2.

The first particle size of the TiO$_2$ 14 can be between about 10 and 40 nanometers. The particle size of the ruthenium particles deposited onto the TiO$_2$ can be from about 5 nanometers to 10 nanometers upon introduction. The ruthenium particles anchor to the TiO$_2$ substrate particles, and additional ruthenium particles attach to the anchored ruthenium particles, effectively growing the size of the overall RuO$_2$ particle to between a range of 10 and 40 nanometers. By initially depositing smaller ruthenium particles onto larger TiO$_2$ particles, the amount of ruthenium used to produce the required activity is reduced. The larger TiO$_2$ particles provide a substrate with sufficient surface area to form the composite support particle 12. The surface area and electroconductivity of the composite particles 12 is also increased due to the network of RuO$_2$ 16 particles on the surface of the composite support particles 12. These non-carbon composite support particles 12 are non-corrosive, eliminating issues that arise from the corrosion within the catalyst layer of the fuel cell.

When active catalyst particles are deposited onto the RuO$_2$/TiO$_2$ non-carbon composite support particles 12, the active catalyst particles will preferentially adhere at the interface of the RuO$_2$/TiO2. By uniformly depositing the RuO$_2$ 16 onto the TiO$_2$ 14, adhesion sites are uniformly located across the RuO$_2$/TiO$_2$ non-carbon composite support particles 12. Therefore, the deposition of the active catalyst particles is also uniform.

Figure 2:
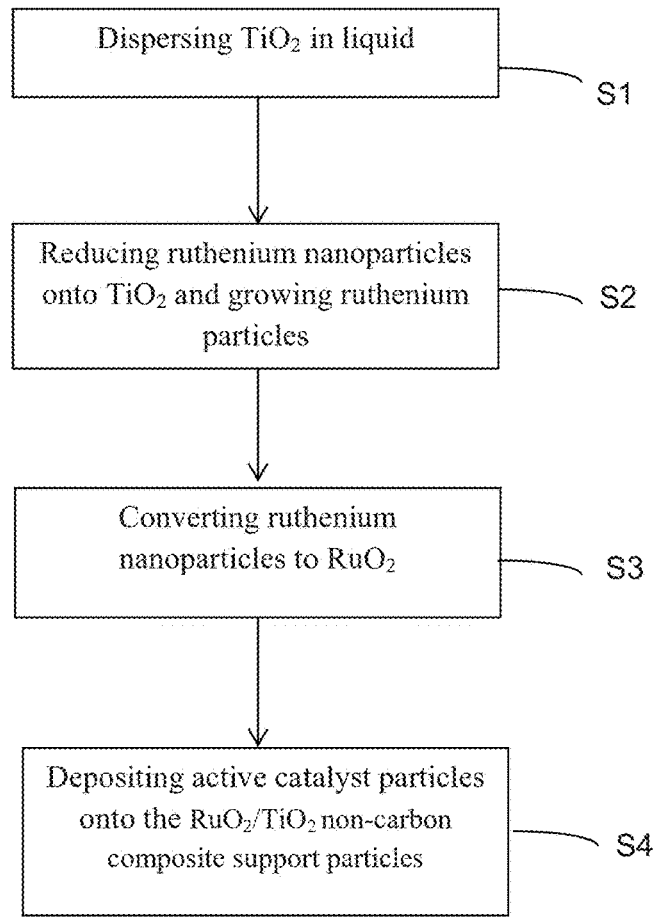
FIG. 2 is a flow diagram of a process of preparing the non-corrosive, non-carbon support particles of FIG. 2.

A method of making an electrocatalyst having the deposited RuO$_2$/TiO$_2$ non-carbon composite support particles 12 is illustrated in FIG. 2. TiO$_2$ particles having a particle size between about 10 and 40 nanometers are dispersed in a liquid in step S1. In step S2, Ru$^{3+}$ ions are reduced onto the TiO$_2$ particles in a solution environment that facilitates the formation of ruthenium particles having a particle size of between 5 and 10 nanometers. The ruthenium particles grow in size as additional ruthenium is reduced and attached to the already attached ruthenium particles. In step S3, the ruthenium particles are converted to RuO$_2$ by exposing the particles to air. The electrocatalyst is completed in step S4, by depositing the active catalyst particles onto the RuO$_2$/TiO$_2$ non-carbon composite support particles.

The solution in which the Ru$^{3+}$ is reduced can be, for example a solution of ethylene glycol or an aqueous solution having surfactants or capping agents such as trisodium citrate, used to inhibit nanoparticle overgrowth and agglomeration. Other ruthenium precursors can be used. Alternatively, ruthenium metal nanoparticles can be used directly and deposited onto the TiO$_2$ particles. The ruthenium metal nanoparticles are then oxidized to RuO$_2$.

Figure 3:
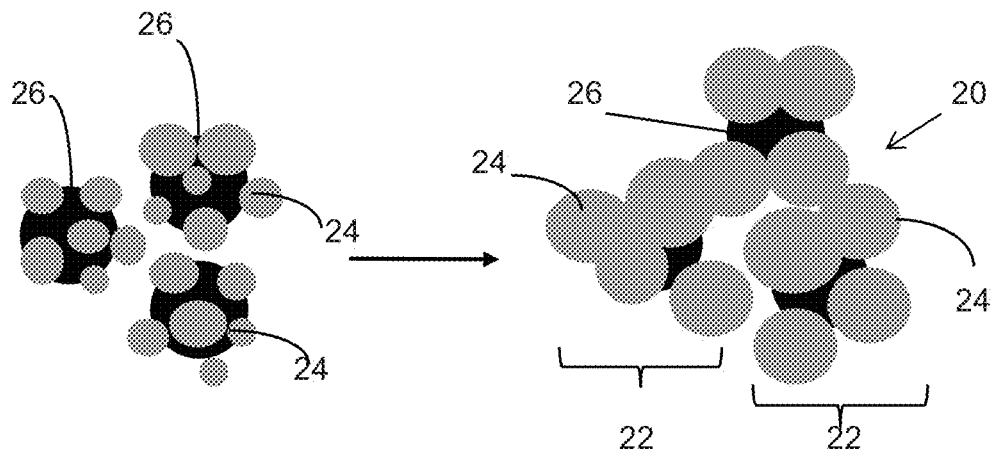
FIG. 3 is a schematic of another embodiment of non-corrosive, non-carbon composite support particles as disclosed herein.

In another embodiment of an electrocatalyst disclosed herein and shown in FIG. 3, the electrocatalyst has non-carbon composite support particles 22 formed from TiO$_2$ 24 and RuO$_2$ 26. TiO$_2$ 24 is deposited onto RuO$_2$ 26 to form the non-carbon composite support particles 22. TiO$_2$ 24 has a first particle size and RuO$_2$ 26 a second particle size, the first particle size being smaller than the second particle size when first introduced, with the first particle size effectively growing to approximate the second particle size. FIG. 3 is a schematic representing the change in the titanium particle size due to agglomeration of the titanium particles as the precursor is reduced. The final size of the TiO$_2$ 24 particle can be controlled based on the amount of the precursor provided for the reduction reaction described with reference to FIG. 4.

The particle size of the titanium can be between about 5 and 10 nanometers upon introduction, while the particle size of the RuO$_2$ 26 substrate can be from about 10 nanometers to 40 nanometers. The smaller titanium particles anchor to the RuO$_2$ substrate particles, and additional titanium particles attach to the anchored titanium particles, effectively growing the size of the overall TiO$_2$ 24 particle to between a range of 10 and 40 nanometers. By initially depositing smaller titanium particles onto larger RuO$_2$ 26 particles, the amount of ruthenium used to produce the required activity is reduced. The larger RuO$_2$ particles provide a substrate with sufficient surface area to form the composite support particle 22. The electroconductivity of the composite particles 22 is present due to the bulk RuO$_2$ 26 of each of the non-carbon composite support particles 22. These non-carbon composite support particles 22 are non-corrosive, eliminating issues that arise from the corrosion within the catalyst layer of a fuel cell.

When active catalyst particles are deposited onto the TiO$_2$/RuO$_2$ non-carbon composite support particles 22, the active catalyst particles will preferentially adhere at the interface of the TiO$_2$/RuO$_2$. By uniformly depositing the TiO$_2$ 24 onto the RuO$_2$ 26, adhesion sites are uniformly located across the TiO$_2$/RuO$_2$ non-carbon composite support particles 22. Therefore, the deposition of the active catalyst particles is also uniform.

Figure 4:
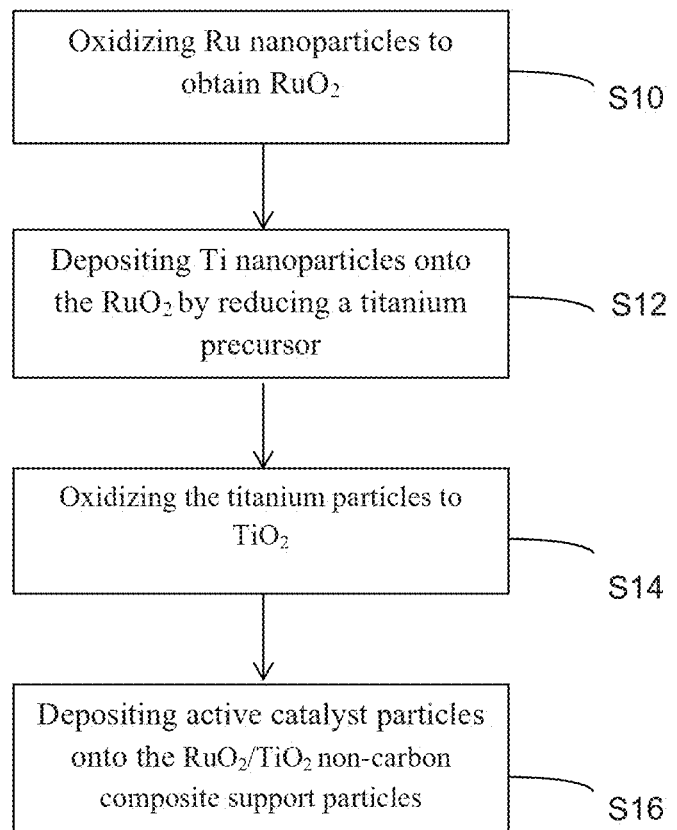
FIG. 4 is a flow diagram of a process of preparing the non-corrosive, non-carbon support particles of FIG. 3.

A method of making electrocatalyst having the deposited TiO$_2$/RuO$_2$ non-carbon composite support particles 22 is illustrated in FIG. 4. In step S10, ruthenium particles having a particle size between about 10 and 40 nanometers are converted to RuO$_2$ by exposing the particles to air. In step S12, a TiO$_2$ precursor is reduced and deposited onto the RuO$_2$ in a solution environment that facilitates the formation of small titanium particle shaving a particle size from about 5 to 10 nanometers. The titanium particles grow in size to between about 10 and 40 nanometers as additional precursor is reduced and titanium is deposited onto the already deposited titanium. TiO$_2$ precursors can be, for example, TiCl$_3$ and TiCl$_4$. The solution in which the TiO$_2$ precursor is reduced can be, for example a solution of ethylene glycol or an aqueous solution having surfactants or capping agents such as trisodium citrate, used to inhibit nanoparticle overgrowth and agglomeration. In step S14, the titanium particles are oxidized to TiO$_2$. The electrocatalyst is completed in step S16, by depositing the active catalyst particles onto the RuO$_2$/TiO$_2$ non-carbon composite support particles.

Figure 5:
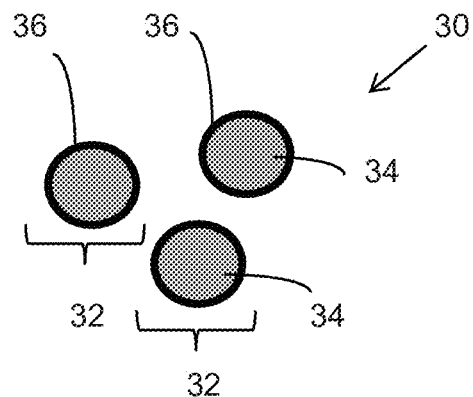
FIG. 5 is a schematic of another embodiment of non-corrosive, non-carbon composite support particles as disclosed herein.

In another embodiment of an electrocatalyst disclosed herein and shown in FIG. 5, the electrocatalyst 30 has non-carbon composite support particles 32 formed in a core shell structure from TiO$_2$ 34 and RuO$_2$ 36. TiO$_2$ 34 is a substrate for one or more layers of RuO$_2$ 36. FIG. 5 illustrates a single layer of RuO$_2$ 36 as a non-limiting example. The RuO$_2$ 36 layer can completely coat the TiO$_2$ 34 substrate, with subsequently deposited active catalyst particles adhered directly to the RuO$_2$ 36 layer. Alternatively, the RuO$_2$ 36 layer can be an imperfect layer, exposing a portion of the TiO$_2$ 34 substrate. The imperfect layer of RuO$_2$ 36 will provide interfaces between the RuO$_2$ 36 and the TiO$_2$ 34 at which active catalyst particles can be adhered. Active catalyst particles can also adhere to the RuO$_2$ 36 layer and the TiO$_2$ 34 substrate. The non-carbon composite support particles 32 have the requisite electroconductivity and are non-corrosive.

Figure 6:
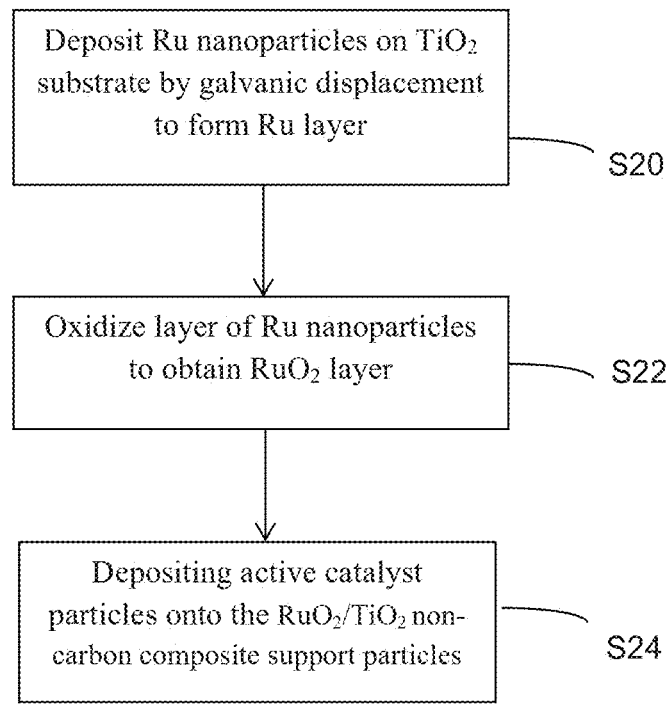
FIG. 6 is a flow diagram of a process of preparing the non-corrosive, non-carbon support particles of FIG. 5.

A method of making the core shell TiO$_2$/RuO$_2$ non-carbon composite support particles 32 is illustrated in FIG. 6. TiO$_2$ powder having the desired particle size is used as the substrate. In step S20, ruthenium nanoparticles are deposited on the TiO$_2$ substrate by galvanic displacement to form a layer of ruthenium on the TiO$_2$ substrate. The layer of ruthenium is then exposed to oxygen or air to oxidize the ruthenium to RuO$_2$ in step S22. The electrocatalyst is completed in step S24, by depositing the active catalyst particles onto the RuO$_2$/TiO$_2$ non-carbon composite support particles.

To reduce the amount of ruthenium required in any of the non-carbon composite supports disclosed herein, while maintaining the electroconductivity and non-corrosiveness of the support, a modified TiO$_2$ can be used. The modified TiO$_2$ is obtained by doping TiO$_2$ with a dopant such as niobium and tantalum. One or more dopant can be used. The modified TiO$_2$ is more conductive than TiO$_2$, and contributes conductivity to the composite support particle. In turn, less conductivity from RuO$_2$ is required.

Figure 7:
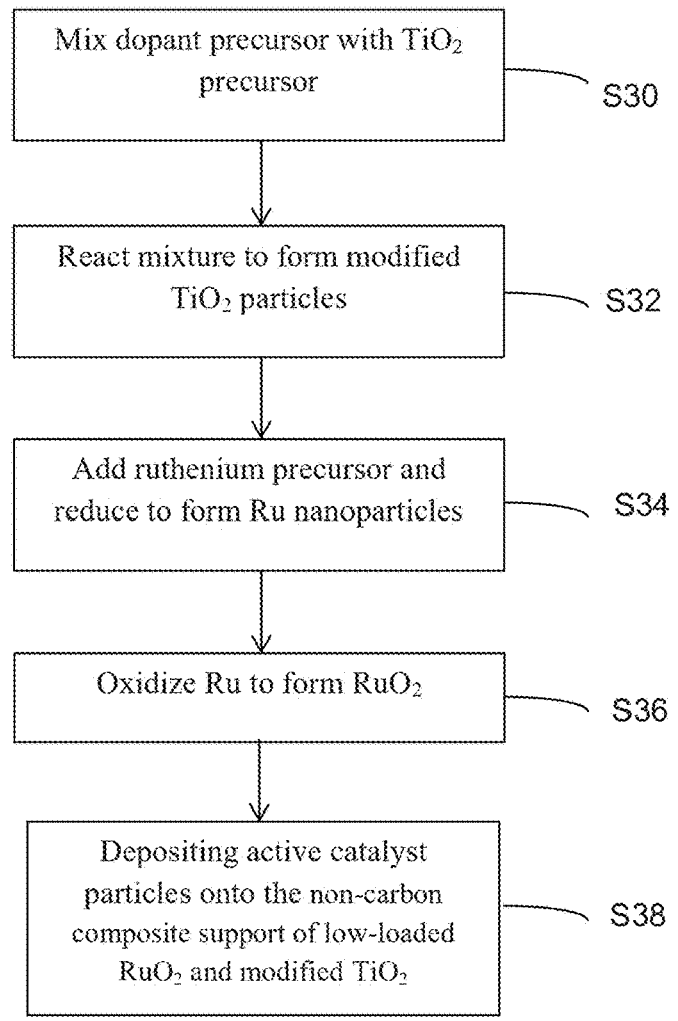
FIG. 7 is a flow diagram of a process of preparing non-corrosive, non-carbon support particles having modified $TiO_2$.

FIG. 7 illustrates a method of making an electrocatalyst with a non-carbon composite support of low-loaded RuO$_2$ and modified TiO$_2$. In step S30, a dopant precursor such as NbCl$_5$ or TaCl$_5$ is mixed with a TiO$_2$ precursor such as TiCl$_3$ or TiCl$_4$. In step S32, the mixture is reacted by heating, hydrolysis or annealing, as non-limiting examples, to form the modified TiO$_2$ particles such as Nb$_x$Ti$_{(1-x)}$O$_y$ or Ta$_x$Ti$_{(1-x)}$O$_y$, depending on the dopant used. In step S34, a ruthenium precursor such as RuCl$_3$ is mixed with the modified TiO$_2$ particles, the ruthenium precursor reduced to ruthenium nanoparticles in an environment that facilitates fine particle formation. In step S36, the ruthenium is oxidized to RuO$_2$ in oxygen or air. The electrocatalyst is completed in step S38, by depositing the active catalyst particles onto the non-carbon composite support of low-loaded RuO$_2$ and modified TiO$_2$.

Figure 8:
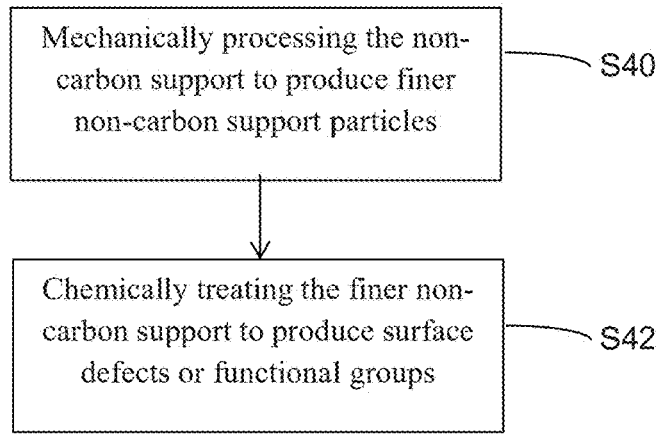
FIG. 8 is a flow diagram of a process of modifying a surface of the embodiments of the non-corrosive, non-carbon support particles disclosed herein.

Active catalyst particles must be well anchored on the support to realize the activity potential of the catalyst. Defect sites on support particles facilitate the dispersion and anchoring of the active catalyst particles. Prior to depositing active catalyst particles onto any of the embodiments of the non-carbon composite support disclosed herein, the surface of the non-carbon composite support particles can be modified to improve the active catalyst particle anchoring. One or both of a mechanical process and a chemical process can be used to modify the surface of the non-carbon support. Mechanical processes can include, for example, mechanical milling of the non-carbon composite support particles. Chemical processes can include, for example, etching with an acid or base or functionalizing the support surface with reactive chemical functional groups that would serve as anchoring sites for the active catalyst particles. FIG. 8 is a flow diagram of the modification process using both mechanical and chemical processes. However, the mechanical process can be used alone or a chemical process can be used alone.

Figure 9:
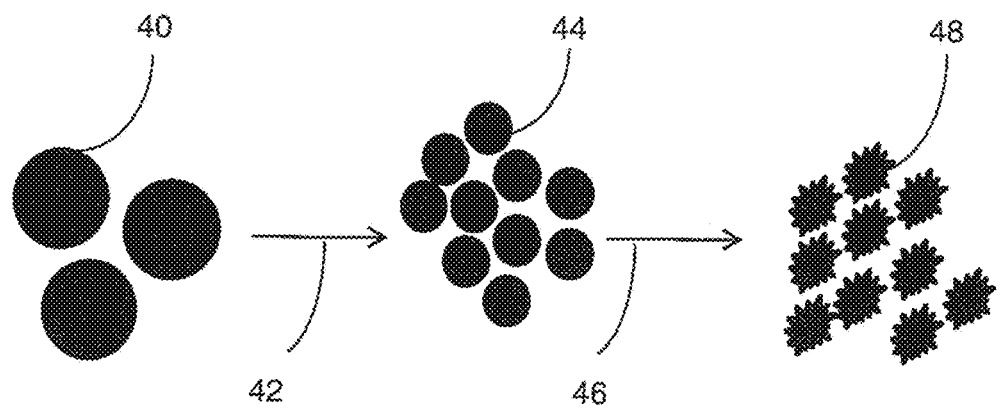
FIG. 9 is a schematic of the modification process of FIG. 8.

As shown in FIG. 8, the synthesized non-carbon catalyst support is mechanically milled in step S40 to reduce the size of the support particles, thus increasing the surface area of the non-carbon support. These fine non-carbon support particles are chemically treated in step S42 to produce defects on the surface of the fine non-carbon support particles or functional groups via which the active catalyst particles will anchor. If the chemical treatment includes acid treatment, non-limiting examples of acids used to create the surface defects include sulfuric acid and nitric acid. The chemical process can be adjusted to control the degree of defects by adjusting one or more of the temperature of the acid, the duration of the etching and the concentration of the acid used. These defects can also increase the surface area, facilitate active catalyst particle deposition and enhance the bond of the catalyst active particles with the non-carbon support particle. FIG. 9 is a schematic of the modification process using both the mechanical and chemical processes. The synthesized non-carbon support particles 40 are mechanically processed 42, resulting in fine non-carbon support particles 44. The fine non-carbon support particles 44 are chemically treated 46 to produce non-carbon support particles 48 with surface defects or functional groups.

As shown in FIGS. 2, 4, 6 and 7, to prepare the electrocatalyst using any of the embodiments of the $RuO_2/TiO_2$ non-carbon composite support particles disclosed herein, active catalyst particles are deposited onto the $RuO_2/TiO_2$ non-carbon composite support particles. The active catalyst particles can be a precious metal such as platinum. Platinum nanoparticles having a diameter of 3 to 6 nanometers can be used as the active catalyst particles.

As an alternative to precious metal nanoparticles, precious metal alloys can be used as the active catalyst particles. For example, a platinum alloy can be deposited onto each non-carbon composite support particle to form the electrocatalyst, the platinum alloy including one or more additional precious or non-precious group metals such as Ru, Co, Ni, etc. By using an alloy, the platinum loading can be reduced while the activity of the catalyst can be maintained or increased.

Another alternative active catalyst particle that can be used with the non-carbon composite support embodiments disclosed herein is a core shell active catalyst particle. Core shell active catalyst particles are one or more layers of precious and/or non-precious metals on a core of a precious and/or non-precious metal. As a non-limiting example, a platinum nanoparticle core can be layered with one or more precious and non-precious metal group metals such as Ru, Co, Ni, etc. The core shell particles are deposited onto the $RuO_2/TiO_2$ non-carbon composite support particles.

The electrocatalyst disclosed herein can be used in various applications, including proton exchange membrane fuel cells for vehicles and stationary power, direct methanol fuel cells, and other similar applications.

As a non-limiting example, the electrocatalyst can be used in a fuel cell, converting chemical energy to an electrical energy by using hydrogen as a fuel and oxygen/air as an oxidant. A fuel cell stack includes a plurality of membrane electrode assemblies, each generally comprising five layers, including a solid polymer electrolyte proton conducting membrane, two gas diffusion layers, and two catalyst layers. Fuel such as hydrogen is fed to the anode side of a membrane electrode assembly, while an oxidant such as oxygen or air is fed to the cathode side of the membrane electrode assembly. Coolant is supplied between the fuel and oxidant, the coolant separated from the fuel and oxidant by separators.

Figure 10:
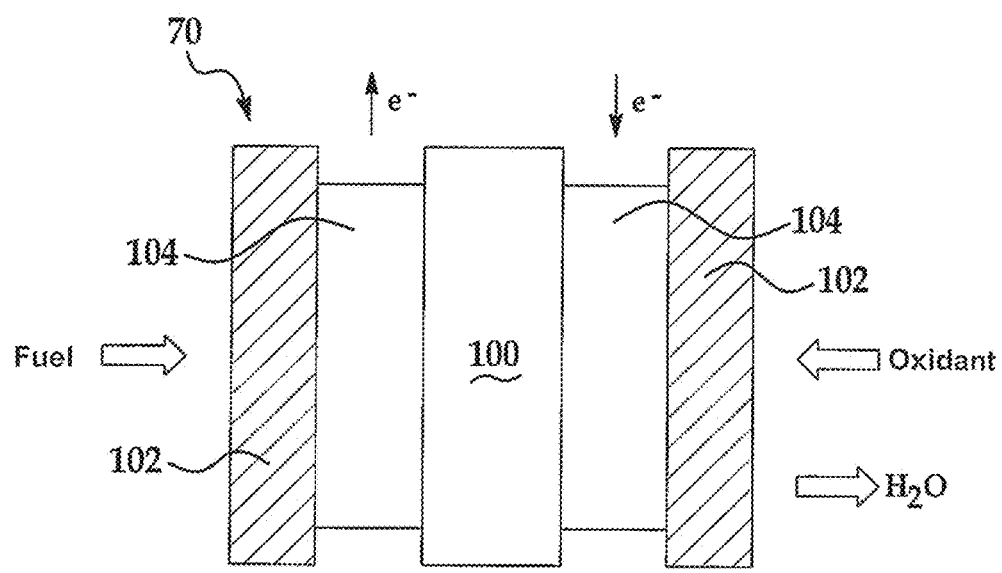
FIG. 10 is a schematic of a fuel cell utilizing the electrocatalyst disclosed herein.

FIG. 10 is an illustration of one of the plurality of fuel cells 70 in the fuel cell stack. The fuel cell 70 is comprised of a single membrane electrode assembly. The membrane electrode assembly has an electrocatalyst coated membrane 100 with a gas diffusion layer 102 on opposing sides of the membrane 100. The membrane 100 has an electrocatalyst layer 104 formed on opposing surfaces of the membrane 100, such that when assembled, the electrocatalyst layers are each between the membrane 100 and a gas diffusion layer 102. Alternatively, a gas diffusion electrode is made by forming one electrocatalyst layer 104 on a surface of two gas diffusion layers 102 and sandwiching the membrane 100 between the gas diffusion layers 102 such that the electrocatalyst layers 104 contact the membrane 100. When fuel, such as hydrogen gas, is introduced into the fuel cell 70, the electrocatalyst layer 104 of the coated membrane 100 splits hydrogen gas molecules into protons and electrons. The protons pass through the membrane 100 to react with the oxidant, such as air, forming water ($H_2O$). The electrons ($e^-$), which cannot pass through the membrane 100, must travel around it, thus creating the source of electrical energy.

In the example provided below, the electrochemical stability of the unique $Pt/TiO_2$—$RuO_2$ electrocatalyst was investigated using both ex situ and in situ tests. The accelerated test protocols include a start-stop protocol and a load cycling protocol. The start-stop protocol mimicks the potential transients that are observed during fuel cell stack startup and shutdown and that contribute to severe electrocatalyst support corrosion, whereas the load-cycling protocol mimicked potential transients seen during full-load to no-load transitions that are sometimes encountered during fuel cell operation, and that contribute to platinum dissolution.

The ex situ screening studies indicate that the $Pt/TiO_2$—$RuO_2$ is an electrocatalyst with exceptionally high stability, but lower activity as a result of larger platinum particle size. Though ex situ tests are useful to screen new candidate materials, the true viability of an electrocatalyst can only be ascertained from in situ tests in a MEA. MEA tests demonstrate both high performance and, more importantly, the exceptional stability of the $Pt/TiO_2$—$RuO_2$ electrocatalyst. Despite the larger Pt particle size in $Pt/TiO_2$—$RuO_2$ catalyst, the $Pt/TiO_2$—$RuO_2$ electrocatalyst yields initial MEA performance slightly lower to that obtained with the benchmark Pt/HSAC electrocatalyst. Because the beginning-of-life and end-of-life performances were nearly identical, the $Pt/TiO_2$—$RuO_2$ catalyst is an electrocatalyst that meets durability targets for automotive fuel cell stacks. Using appropriate processing methods to lower Pt particle size, the activity of the $Pt/TiO_2$—$RuO_2$ can be further enhanced.

When the catalysts were subjected to the load-cycling protocol for 10,000 cycles, there was a significant loss in electrochemical surface area observed in each case, consistent with platinum dissolution and agglomeration. Though $TiO_2$—$RuO_2$ is a corrosion-resistant catalyst support, it is not designed to mitigate Pt dissolution. However, there was minimal detrimental impact on performance for either catalyst despite the significant Pt dissolution observed. This result suggests that the stability of the support is far more important than the stability of the platinum particles that are loaded onto the support in terms of avoiding stack failure.

The fuel cell stack is likely to be much more forgiving of platinum dissolution and agglomeration during load cycling than of support corrosion and related effects arising from startup and shutdown cycles. In conjunction with the fact that hybridization methods will inevitably be used to minimize load cycling, identifying a corrosion-resistant support is a key priority, and $TiO_2$—$RuO_2$ support is such a support.

$TiO_2$—$RuO_2$ (Ti:Ru mol ratio 1:1) support material was prepared by precipitation of ruthenium hydroxide on commercial $TiO_2$ nanopowder dispersed in deionized water (Aeroxide P25, BET surface area 50 m2/g; Acros Organics). The powder was calcined at 450° C. for 3 h in air to yield anhydrous, electron-conducting $TiO_2$—$RuO_2$. This material had a BET surface area of 33±2 m2/g and an electron conductivity of 21 S·cm-1; both values are lower than typically reported for Vulcan carbons (~200 m2·g-1 and 30 S·cm-1) but are reasonable for a catalyst support material. Platinum nanoparticles were deposited on the catalyst support by the reduction of hexachloroplatinic acid precursor with formic acid. The resultant Pt nanoparticles had diameters ranging between 4 and 6 nm as shown in FIGS. 11A and 11B. The relatively high particle size resulted in lower values for the ECSA.

The electrochemical stability of the $TiO_2$—$RuO_2$ support and Pt/$TiO_2$—$RuO_2$ catalyst were evaluated using accelerated stress test protocols similar to those developed by the Fuel Cell Technical Team of the US Drive Partnership in collaboration with the US Department of Energy, with some minor differences as described below. In this study, we used two different protocols that measure (i) the stability of the support due to start/shutdown voltage spikes, either standalone support or catalyzed support, the latter to investigate the impact of platinum catalyst on the support corrosion rate ("start-stop protocol"), and (ii) Pt catalyst degradation due to dissolution/Ostwald ripening as a consequence of load cycling—excursions to near the open-circuit potential—during normal fuel cell operation ("load-cycling protocol"). These protocols effectively imitate and induce, in an accelerated fashion, the degradation mechanisms that occur during extended normal fuel cell vehicle operation.

It is generally accepted by automotive OEMs that the fuel cell stack in an automobile should operate for at least 5,000 h and 60,000 startup/shutdown cycles without any significant voltage loss. To evaluate the stability of the support using the start-stop protocol, shown in FIG. 12A, the working electrode potential was cycled in a triangular waveform between 1.0 and 1.5 V at a scan rate of 500 mV/s (triangular wave form) for 5,000 cycles. Cyclic voltammograms (CV) were recorded initially (baseline) and after 100, 200, 500, 1,000, 2,000, and 5,000 cycles to characterize the support by estimating the electrode pseudocapacitance (or, in an equivalent method, the current at 0.4 V in the capacitive region of the CV).

Changes in fuel cell load occur as a consequence of the varying power demands that are incurred during a typical drive cycle. Although somewhat buffered by hybridization strategies, some level of load cycling is inevitable. To evaluate the stability of the platinum catalyst under load cycling, shown in FIG. 12B, the cathode potential was cycled in a rectangular waveform from 0.95 V (near the open circuit voltage; approaching no-load conditions) to 0.6 V (close to the maximum power; approaching full load conditions) for 10,000 cycles. Note that the US Drive load-cycling protocol is slightly different, and involves potential cycling from 0.65 to 1 V. CVs were recorded initially, and after 100, 200, 500, 1,000, 2,000, 5,000, and 10,000 cycles. The stability of the catalyst was evaluated from the measured change in ECA and in electrode polarization.

The conventional Pt/high surface area C (HSAC) support and catalyst and the Pt/$TiO_2$—$RuO_2$ were examined with both protocols described above. In the figures, the Pt/$TiO_2$—$RuO_2$ catalyst is denoted as Pt/TRO. The experiments were performed both ex situ on supports/catalysts deposited onto a glassy carbon RDE, and in situ in a fully assembled fuel cell. The experiments were always performed with the working electrode placed in a nitrogen environment to minimize side reactions. The durability ex situ experiments were performed in an RDE setup at 60° C. using 0.1 M perchloric acid as the electrolyte, a glassy carbon rod counter electrode, and a hydrogen reference electrode. Both CV (at a scan rate of 50 mV/s) and linear polarization (scan rate of 10 mV/s, various rotation rates) were performed at room temperature for ORR evaluation.

The in situ experiments were performed in a 25 $cm^2$ single fuel cell. MEAs were prepared using a Nafion 211 membrane, with anode catalyst loading of 0.4 mg/cm2 Pt/HSAC and cathode catalyst loading of 0.35 mg/cm2. The experiments were performed at 80° C., passing hydrogen (0.5 L/min) through the anode (counter and pseudoreference electrode) side and nitrogen through the cathode/working electrode (0.5 L/min). The gases were humidified at either 100% relative humidity (RH) or 40% RH before entry into the cell. The 100% RH operating point was chosen to maximize carbon corrosion during the accelerated test (at high voltage, carbon corrosion requires water). The 40% RH condition was chosen as a possible operating point for the fuel cell stack in an automobile.

CV and V-I polarization curves were obtained at the beginning and end of the potential cycling tests for each of the MEAs tested. The V-I polarization curves were obtained at 100% and 40% relative humidity, using hydrogen as fuel and air as oxidant. Initially, several preliminary experiments were performed to ascertain whether the in situ and ex situ approaches yielded similar results. Both methods yielded near identical results in terms of induced loss in ECSA upon exposure to said protocols.

Subsequently, both catalysts were exposed to the start-stop protocol ex situ, and the impact of this test on the catalyst was studied using CV. The results are shown in FIGS. 13A and 13B. Pt/$TiO_2$—$RuO_2$ did not show any sign of surface modification or instability, as observed for Pt/HSAC, and the H2 adsorption peak potential did not shift unlike in Pt/HSAC. Both observations indicated the superior stability of the $TiO_2$—$RuO_2$ support upon potential cycling.

The ratio of ionomer to support (well-studied for Pt/C) was then optimized for the Pt/$TiO_2$—$RuO_2$ catalyst via an ex situ RDE study. An optimal ionomer-to-catalyst ratio (I/C) value of 0.58 g/g was obtained (contrast with 0.43 for Pt/HSAC). The ECSA; ORR mass and specific activities; number of electrons transferred during the ORR; and the Tafel slopes for the ORR were measured for both catalysts at their optimal I/C ratios.

Figure 14A:
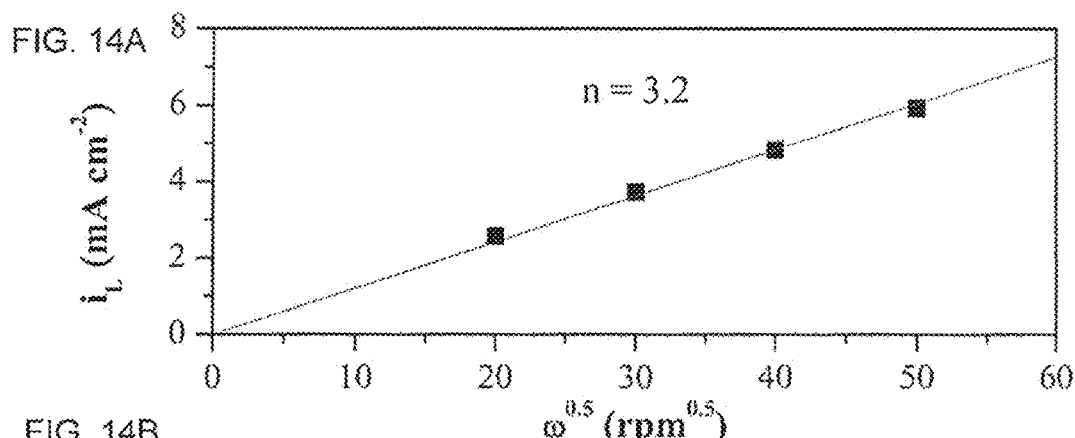
FIGS. 14A-14C are a Levich plot showing the number of electrons transferred, a Koutechy-Levich plot and a Tafel slope obtained from the kinetic currents extracted from the Koutechy-Levich plot, respectively, for 40% Pt/TiO$_2$—RuO$_2$ catalyst.
Figure 14B:
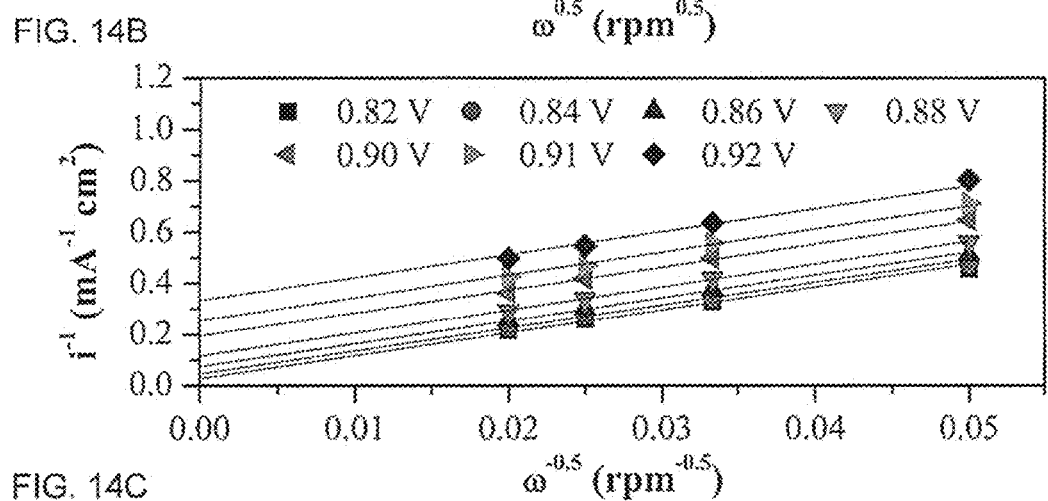
Figure 14C:
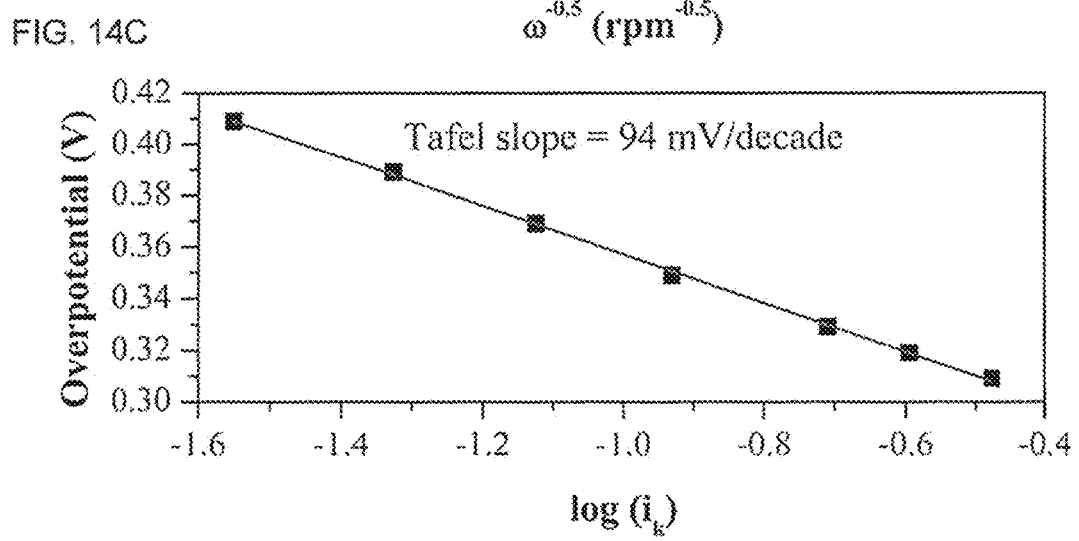
Figure 15A:
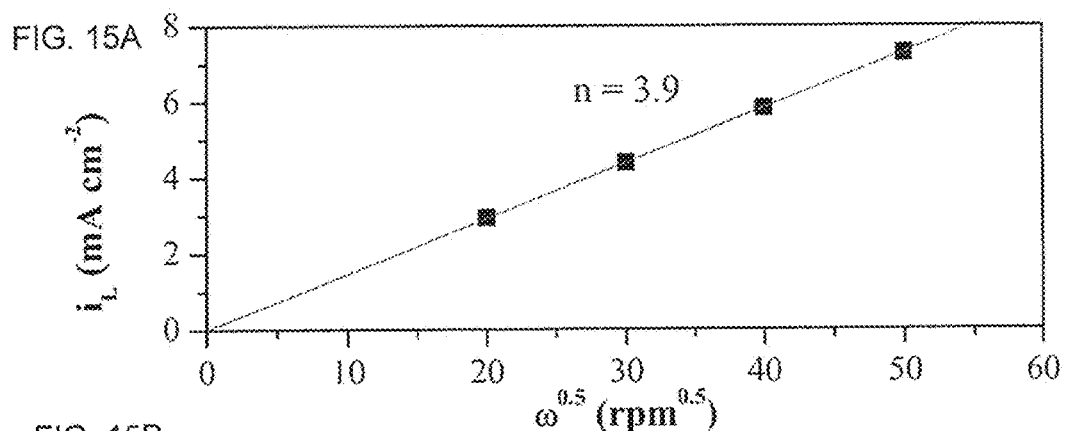
FIGS. 15A-15C are a Levich plot showing the number of electrons transferred, a Koutechy-Levich plot and a Tafel slope obtained from the kinetic currents extracted from the Koutechy-Levich plot, respectively, for 40% Pt/HSAC catalyst.
Figure 15B:
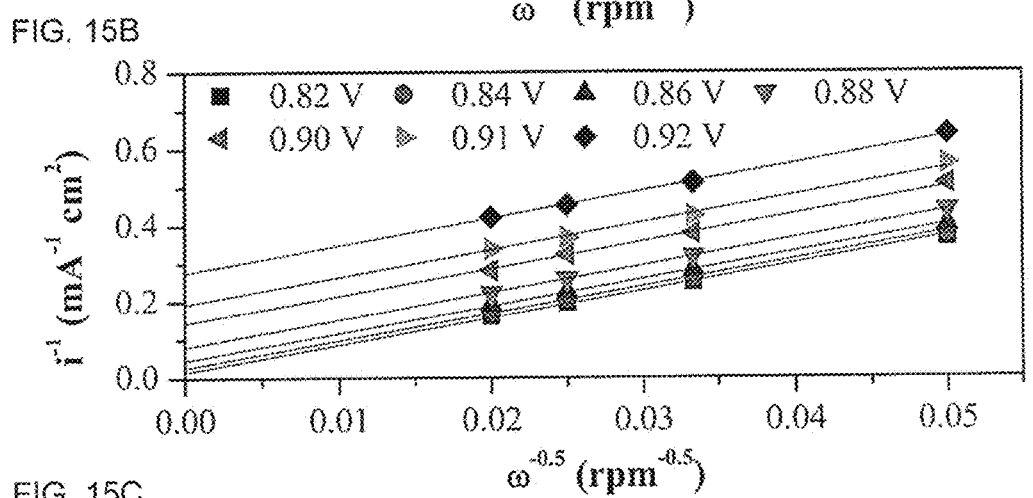
Figure 15C:
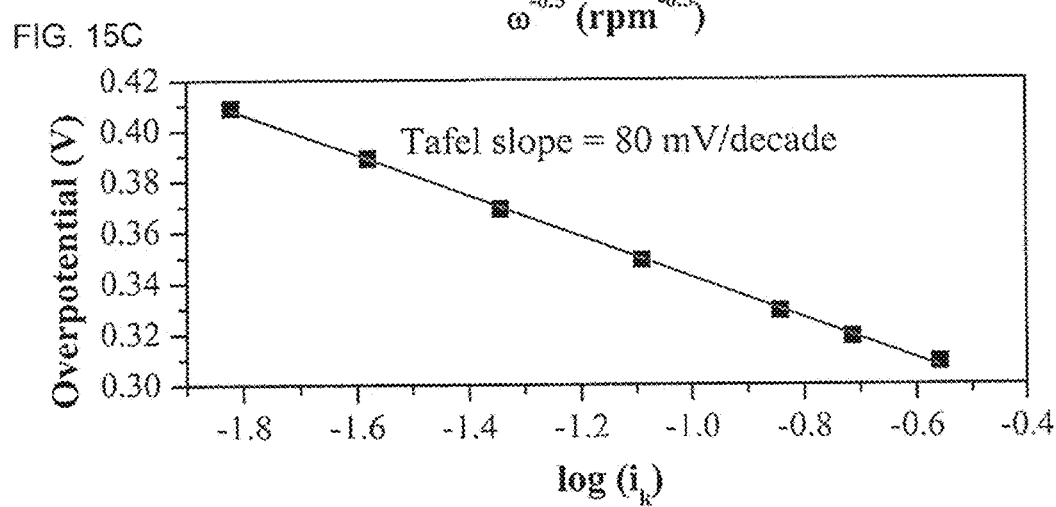

The Pt/$TiO_2$—$RuO_2$ had lower ECSA and mass activities, but a higher specific activity than Pt/HSAC due to the larger platinum particle size (4-6 nm) in Pt/$TiO_2$—$RuO_2$. The number of electrons transferred during the ORR was estimated from a Levich plot to be 3.2 for Pt/$TiO_2$—$RuO_2$ and 3.9 for Pt/HSAC, as shown in FIGS. 14A and 15A, respectively. A Koutechy-Levich analysis was performed for each catalyst, shown in FIGS. 14B and 15B, respectively. The Tafel slopes, shown in FIGS. 14C and 15C respectively, and obtained from the kinetic currents extracted from the Koutecky-Levich analysis of FIGS. 14B and 15B, were 94 for Pt/TiO$_2$—RuO$_2$ and 80 for Pt/HSAC, respectively.

Figure 16:
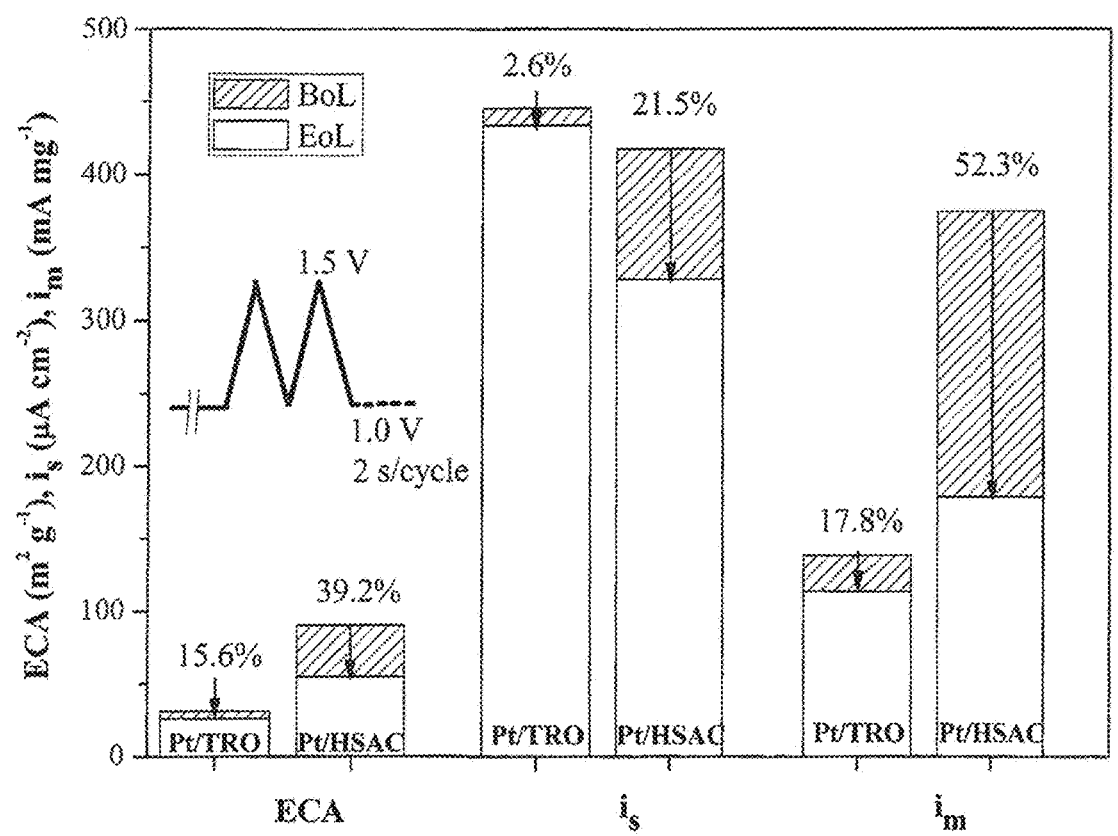
FIG. 16 is a graphic comparison of ECSA and ORR specific ($i_s$) and mass ($i_m$) activity for Pt/HSAC and Pt/TiO$_2$—RuO$_2$ catalysts before (BoL) and after (EoL) the start-stop protocol.

The ECSA, mass activity ($I_m$), and specific activity ($i_s$) of Pt/TiO$_2$—RuO$_2$ and Pt/HSAC were then estimated for both catalysts upon exposure to the start-stop protocol ex situ shown in FIG. 12A. The TiO$_2$—RuO$_2$ support showed much better stability than high surface area carbon. As shown in FIG. 16, the loss in ECSA, specific activity, and mass activity after 5,000 start-stop cycles were, respectively, 15.6%, 2.6%, and 17.8% for Pt/TiO$_2$—RuO$_2$. In comparison, Pt/HSAC was much more severely degraded. The ECSA dropped by 39.2%, specific activity dropped by 21.5%, and mass activity dropped by 52.3%. These ex situ studies suggest that TiO$_2$—RuO$_2$ is a very stable support and that Pt/TiO$_2$—RuO$_2$ is indeed a much more stable electrocatalyst than Pt/HSAC, albeit perhaps less active due to the larger platinum particle size.

Figure 17:
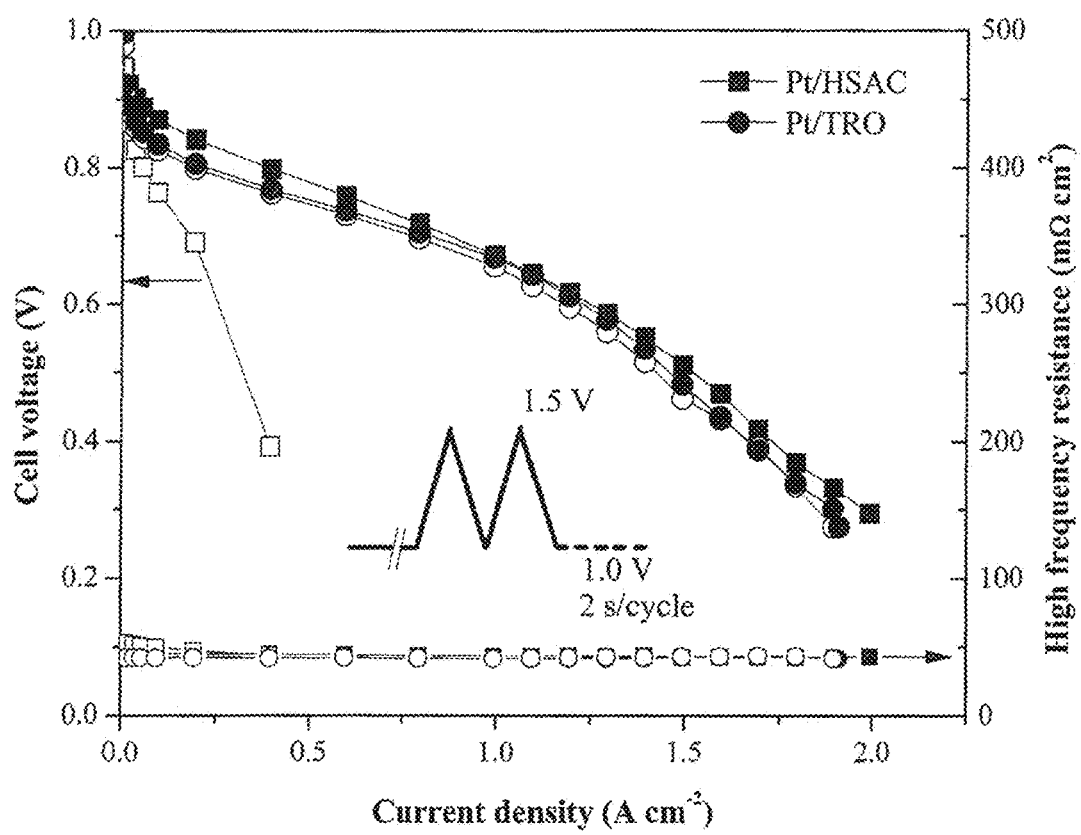
FIG. 17 is a graphic comparison of fuel cell performance at 100% RH obtained with Pt/HSAC and Pt/TiO$_2$—RuO$_2$ before and after exposure to the start-stop protocol.
Figure 18:
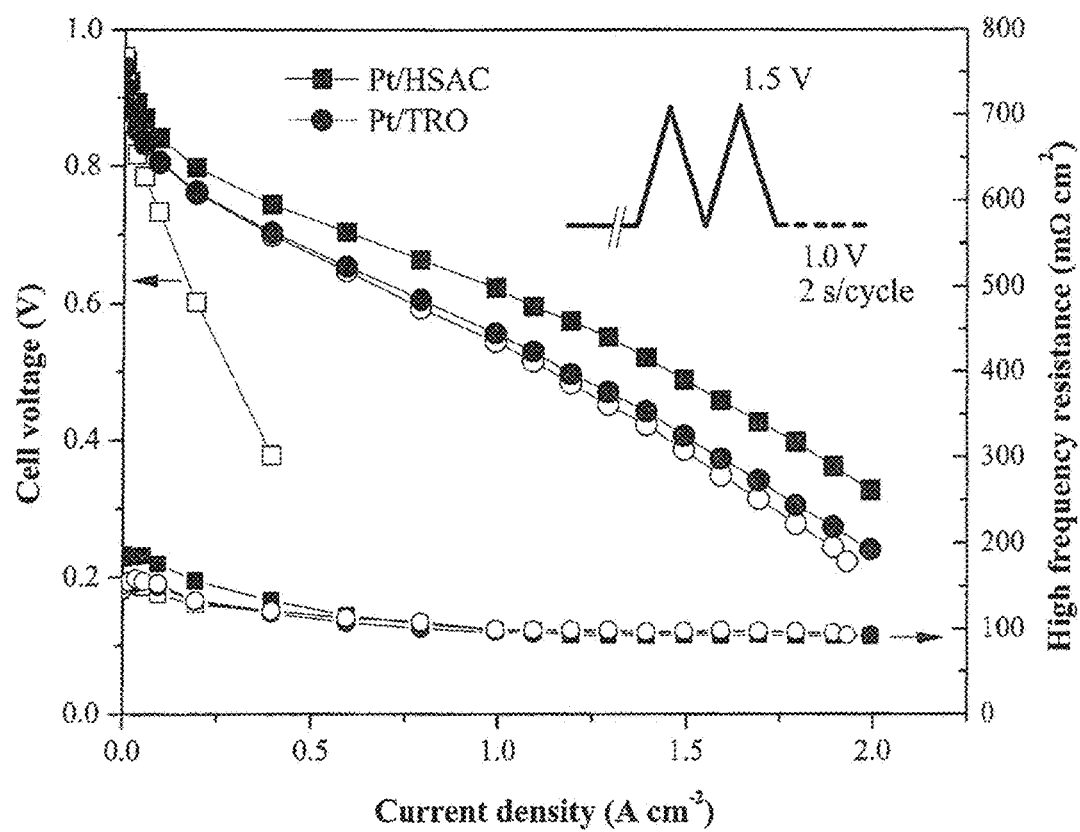
FIG. 18 is a graphical comparison of fuel cell performance at 40% RH obtained with Pt/HSAC and Pt/TiO$_2$—RuO$_2$ before and after exposure to the start-stop protocol.

In situ accelerated degradation tests were then performed on MEAs. FIG. 17 shows the polarization curves obtained (at 100% RH) on MEAs prepared with Pt/TiO$_2$—RuO$_2$ and Pt/HSAC before and after exposure to the start-stop protocol, in situ. There are two significant observations to note. First, despite the larger Pt particle size, and concomitantly lower ECSA and mass activity as ascertained by ex situ RDE tests, the Pt/TiO$_2$—RuO$_2$ electrocatalyst yielded an initial MEA performance that was slightly lower (especially at lower current densities) to that obtained with an established benchmark in line with industry standards. This finding indicates that the Pt/TiO$_2$—RuO$_2$ catalyst is very much viable in terms of catalytic activity and performance. Second, and even more significantly, whereas the Pt/HSAC MEA revealed a very significant (and most likely catastrophic) loss in performance, the Pt/TiO$_2$—RuO$_2$ shows minimal loss in performance upon exposure to 1,000 start-stop cycles. The loss in cell voltage at 1 A/cm2 at 100% RH is only ~15 mV for Pt/TiO$_2$—RuO$_2$, whereas the corresponding loss is too high to permit operation at 1 A/cm2 for Pt/HSAC, whose MEA failed at a current density of ~0.4 A/cm2. The 40% RH data, shown in FIG. 18, revealed a similar trend in terms of stability—exceptional stability for Pt/TiO$_2$—RuO$_2$ as opposed to very poor stability for Pt/HSAC. These observations are attributed to the much higher stability of the TiO$_2$—RuO$_2$ support compared with HSAC.

Figure 19A:
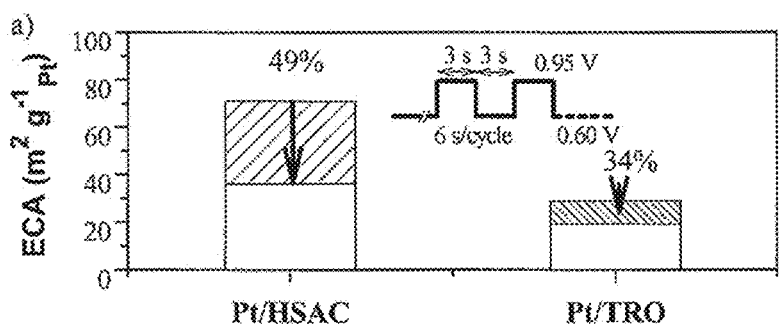
FIGS. 19A-19C are graphs illustrating fuel cell performance of 40% Pt/TiO$_2$—RuO$_2$ and Pt/HSAC catalyst upon exposure to the load-cycling protocol with FIG. 19A being a graph of ECSA of the catalysts before the test (BoL) and after (EoL) at 10,000 cycles at 80° C. and 40% relative humidity, FIG. 19B illustrating polarization curves before (closed symbols) and after (open symbols) the test at 80° C. and 40% relative humidity and FIG. 19C showing a comparison of cell voltage losses at 1 A/cm-2 for each catalyst depending on the relative humidity used during the load-cycling protocol.

MEAs prepared with each catalyst were then exposed to the load-cycling protocol shown in FIG. 12B. Both catalysts were tested in an MEA at 80° C. and both 40% and 100% inlet relative humidity to ascertain catalyst stability upon exposure to the load cycling protocol and the impact of any deterioration in the catalyst on fuel cell performance. FIG. 19A shows the initial and post-test ECSAs of each catalyst. Both catalysts, as expected, were impacted negatively by this test, which creates conditions for Pt dissolution and migration. The goal in this study is to prepare a support that is resistant to corrosion/oxidation. But efforts were taken to stabilize the Pt catalyst on the support by functionalizing the surface of the support prior to depositing the active catalyst particles. One or both of the mechanical process and the chemical process described with reference to FIGS. 8 and 9 can be used to functionalize the surface of the non-carbon support.

Figure 19B:
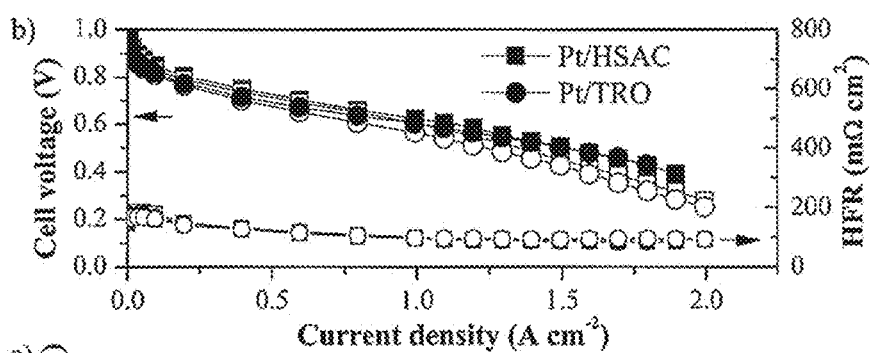
Figure 19C:
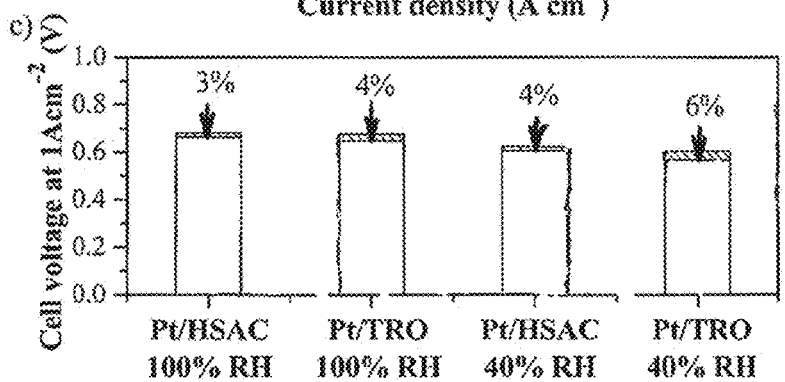

FIGS. 19B and 19C show that despite the loss in ECSA, the actual impact in performance is at best minimal, suggesting that the platinum dissolution does not necessarily lead to rapid cell failure. At an expected operating point of 1 A/cm2, at most, a 6% loss in performance is seen after the load-cycling test, and there is little to differentiate between the catalysts in terms of performance loss. This finding is different from the steep and catastrophic loss in performance seen in the Pt/HSAC catalyst upon exposure to the start-stop protocol. This result suggests that the stability of the support is much more important, from the context of cell and stack failure, than the stability of the platinum particles that are loaded onto the support.

Figure 20:
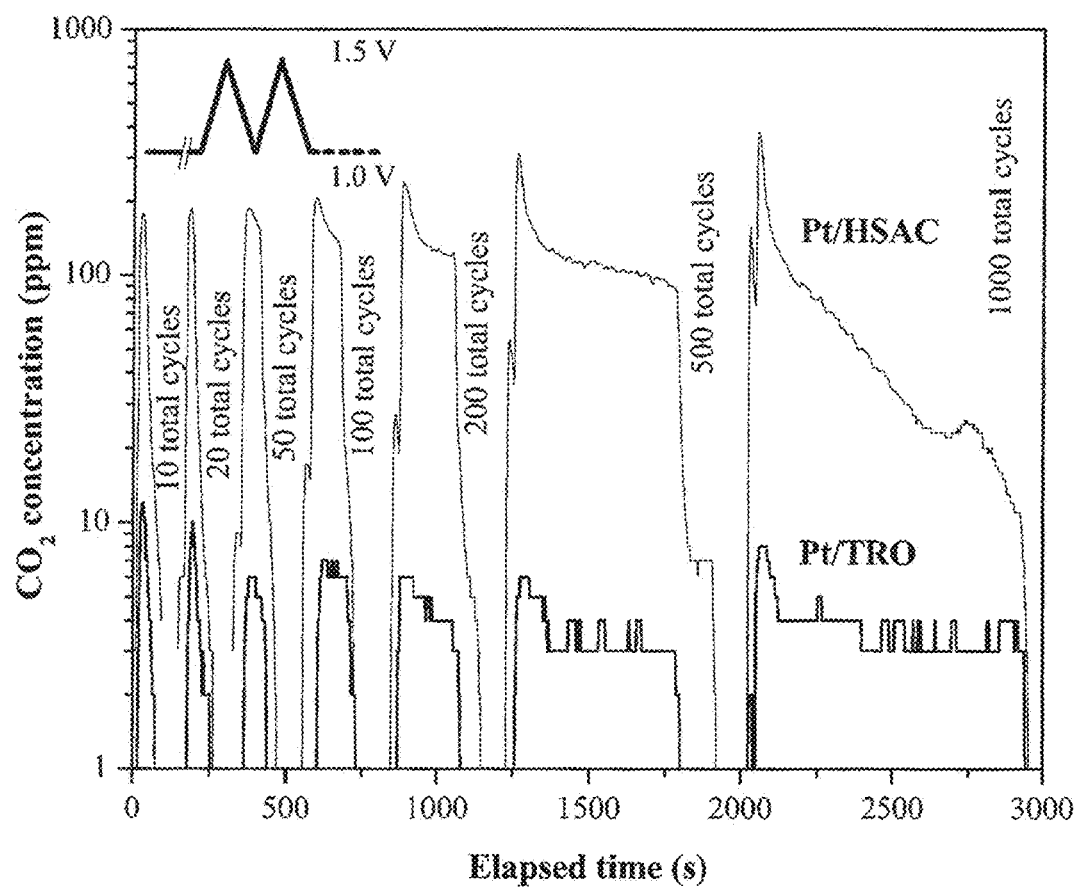
FIG. 20 is a graph illustrating evolution of carbon dioxide in the cathode exit stream during the in situ support durability test (start-stop protocol) for Pt/HSAC and Pt/TiO$_2$—RuO$_2$ catalysts.

Finally, we measured the carbon dioxide concentration in the cathode exit stream during the accelerated degradation test (start-stop protocol) and found extremely low levels of CO$_2$ (between 3 and 10 ppm) in the case of Pt/TiO$_2$—RuO$_2$ (FIG. 20). In contrast, the CO$_2$ emission levels from a conventional Pt/HSAC catalyst were ~200 ppm. Of course, the Pt/TiO$_2$—RuO$_2$ is carbon-free, and no CO$_2$ emission would emanate from this material. This observation is, however, a clear indicator that the main source of carbon being oxidized to carbon dioxide in an MEA is the carbon catalyst support, and not the gas diffusion layer (GDL) or the graphite flow fields. Both MEAs in this study use identical GDLs and flow fields. It is believed the small amount of CO$_2$ observed in the MEA prepared with Pt/TiO$_2$—RuO$_2$ arose from the corrosion of carbon in the microporous layer of GDL. This is a unique method to quantify the corrosion rate (in situ) of the carbon in the GDL microporous layer. The Pt/TiO$_2$—RuO$_2$ catalyst can be used in the future in conjunction with carbon dioxide monitoring to measure the corrosion rate of candidate GDLs.

Both in situ and ex situ experiments confirmed that TiO$_2$—RuO$_2$ is an exceptionally stable catalyst support, and that Pt/TiO$_2$—RuO$_2$ is an exceptionally stable electrocatalyst that yields initial (and final) fuel cell performance slightly lower than Pt/HSAC catalyst.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrocatalyst, comprising:
    non-carbon composite support particles, each non-carbon composite support particle comprising titanium dioxide and ruthenium dioxide, wherein ruthenium dioxide nano-particles are non-uniformly deposited on a titanium dioxide nano-particle, forming uniformly located adhesion sites between the titanium dioxide and the ruthenium dioxide, wherein the titanium dioxide nano-particle has a first particle size and each ruthenium dioxide nano-particle has a second particle size, the first particle size and the second particle size being the same.

2. The electrocatalyst of claim 1, further comprising active catalyst particles deposited onto the non-carbon composite support particles at the uniformly located adhesion sites.

3. The electrocatalyst of claim 1, wherein the first particle size and the second particle size are one size selected between 10 and 40 nanometers.

* * * * *